Figure 1:
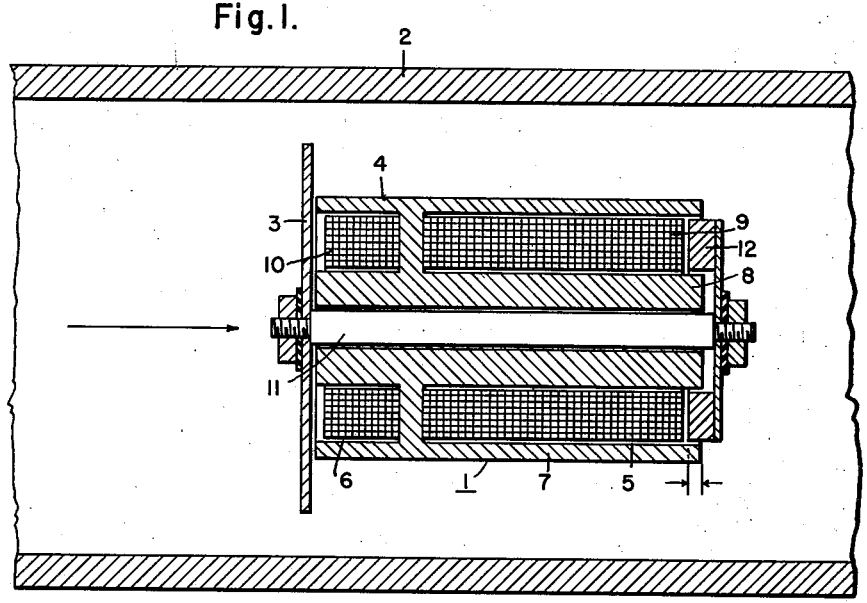

Oct. 16, 1951   F. W. GODSEY, JR   2,571,863
FORCE RESPONSIVE DEVICE FOR FLOW METERS
Filed Dec. 22, 1948

WITNESSES:
Edward Michaels
E. F. Oberhein

INVENTOR
FRANK W. GODSEY, Jr.
BY
Paul E. Friedemann
ATTORNEY

Patented Oct. 16, 1951

2,571,863

UNITED STATES PATENT OFFICE 2,571,863

FORCE RESPONSIVE DEVICE FOR FLOW METERS

Frank W. Godsey, Jr., Pittsburgh, Pa., assignor to Westinghouse Electric Corporation, East Pittsburgh, Pa., a corporation of Pennsylvania Application December 22, 1948, Serial No. 66,746

5 Claims. (Cl. 73—141)

This invention relates generally to force measuring devices and more in particular to such devices applicable in the measurement of fluid flow rates.

It is conventional practice in the measurement of the flow rate of fluids to utilize a pair of flexible bellows, responsive to the pressure on opposite sides of an orifice in a liquid conducting duct. The pressure differential appearing on opposite sides of the orifice in the duct is proportional to the square of the rate of fluid flow. Hence, the relative displacement of the flexible bellows or the differential of the forces thereof is proportional to the square of the rate of fluid flow and various types of arrangements are provided for detecting and indicating the response of the bellows to the rate of fluid flow for the purpose of indicating fluid flow.

Such devices, however, are, as a rule, delicate in construction and difficult to adjust and to maintain in adjustment for an appreciable length of time and as a consequence under severe operating conditions in the environments for which they are intended, their operation is ordinarily not reliable.

Broadly, it is an object of this invention to provide a force responsive device which is simple in its elements and positive in operation.

Another equally important object is to provide a device of the class mentioned which is sturdy and compact and which is of unitary structure affording ease of installation.

A further object of this invention is to provide a device of the class described which is easily calibrated and which when once calibrated will remain in calibration under its intended operating conditions.

More specifically stated, it is an object of this invention to provide a liquid flow indicator which is comprised of electromagnetic components.

The foregoing statements are merely illustrative of the various aims and objects of this invention. Other objects and advantages will become apparent upon a study of the following specification when considered in conjunction with the accompanying drawing in which Figure 1 illustrates a liquid flow responsive device embodying the principles of this invention; and Fig. 2 is a circuit diagram illustrating the connection of the liquid flow device for indicating the rate of flow of a fluid medium.

Briefly stated, this invention comprises an electromagnet, the pull of which is substantially independent of displacement of its armature. The armature of the electromagnet is disposed to mechanically bias a disc which is placed in a position normal to the flow of the fluid, the force imposed on the disc by the armature of the electromagnet being in opposition to the force thereon due to the impact of the fluid. The current supplied to the coil of the electromagnet is controlled by suitable electromagnetic means responsive to slight movements of the disc in the fluid stream. Forces acting on the disc supported in the fluid stream are proportional to the square of the rate of fluid flow while the pull of the electromagnet exerting the opposition force on the disc is proportional to the square of current which is circulated in its coil. As a consequence the two square laws are matched in this flow indicating device and the current flowing through the coil of the electromagnet is a linear indication of the rate of flow of the fluid.

Figure 2:
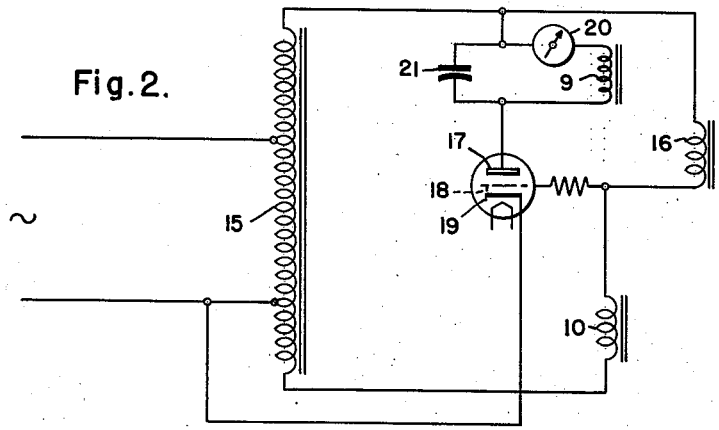

A preferred embodiment of this invention based upon the principles hereinbefore outlined is illustrated in Fig. 1. This embodiment includes generally an electromagnetic unit 1 which is supported within a pipe 2 in which the rate of fluid flow is to be measured. A disc 3 of larger diameter than the housing 4 of the electromagnetic components of this device is disposed with its surface substantially normal to the path of flow of the fluid through the pipe 2. The housing 4 is made of a magnetic material suitable to the flow of alternating magnetic fluxes and is provided with a circular recess 5 (for an electromagnet) and a circular recess 6 (for a strain gauge) in each of its extremities, the recess walls forming an outer shell 7 and a cooperating core portion 8. Each of the recesses encloses an annular winding, that for the electromagnetic unit being designated 9 and that for the strain gauge component of the device being designated 10. The two coil structures are mechanically integral for convenience in manufacture only. The disc 3 is formed of suitable magnetic material and forms the armature for the strain gauge unit. As illustrated, the rear face of the disc confronts the left extremity of the member 4, which is circular in cross-section to conform to the disc and is spaced therefrom a slight distance to form airgaps therebetween which are varied upon axial movement of the disc. The disc is supported upon one extremity of a rod 11 which is slidably mounted in a suitable hole extending through the core 8. At the other end of the rod 11 an armature 12 of magnetic material is disposed. This armature is of the form of a ring and fits within the extremity of the annular recess 5 which houses the coil of the electromagnet. Sufficient overlapping axially of the armature 12 with the walls of the recess 5 is provided so that no appreciable change in the area of the radial airgaps which are formed by this construction occurs over the working range of the device. As a consequence for a given current in the coil of the electromagnet 8 the pull of the electromagnet will be substantially constant regardless of the position of the armature with respect to the cylindrical member 4 over its working range.

The strain gauge assembly including the coil 10 and the disc 3 which functions as the movable armature of the strain gauge, is of the variable inductance type and movement of the disc 3 or armature with respect to the housing 4 results in variations of the airgaps formed therebetween. This results in a change in inductance of the coil 10 and this change in inductance is utilized to control the current which energizes the coil 8 of the electromagnet.

A specific circuit for accomplishing this is illustrated in Fig. 2. In this illustration an auto transformer 15 is energized from a suitable source of alternating current indicated by the sinusoidal wave. The coil 10 of the strain gauge is connected in series with a suitable reactor 16 across a tapped portion of the auto transformer 15. Thus an alternating current voltage is applied to the coil of the strain gauge and the voltage of this coil will vary in dependence of of displacements of the disc or strain gauge armature 3. Changes in voltage of the coil 10 of the strain gauge are amplified in a suitable electronic tube 13 comprising a plate 17, a grid 18 and a cathode 19. The grid 18 of the electronic tube being connected to the circuit for the coil 10 of the strain gauge to be controlled in dependence of the strain gauge coil voltage. Plate voltage for the tube 13 is provided by a suitable connection with the auto transformer, the plate circuit including the coil 9 of the electromagnet which is connected in series with a suitable milliameter 20. A capacitor 21 which is connected in parallel with the milliameter and the coil 9 of the electromagnet is provided to smooth the ripples in this circuit. The cathode 19 of the tube 13 is connected to a suitable tap of the auto transformer to complete the connection of the tube.

The operation of this device is substantially as follows:

Fluid flow in the pipe develops a pressure difference across the disc 3 which tends to force the disc to the right as viewed in Fig. 1, the force on the disc being proportional to the square of the rate of fluid flow. This shortens the airgap of the strain gauge and increases its inductance. The increase in inductance of the coil of the strain gauge raises the voltage of the strain gauge coil in series with the fixed inductance 16 which raises the voltage of the grid 18 of the tube 13. Increasing the grid voltage increases the plate current of the tube 13 and this increased plate current flows through the coil 9 of the electromagnet and the milliameter 20. The armature 12 of the electromagnet is pulled towards the left, as viewed, in opposition to the fluid force bias on the disc 3, forcing the disc towards the left and increasing the gaps of the strain gauge. This action continues until the amplifier tube 13 and strain gauge circuit lets just enough D. C. current flow through the coil 9 of the electromagnet to hold the disc balanced against the fluid pressure. In view of the matching of the square laws of the electromagnet and of the fluid flow in this device it will be appreciated that the current flow through the coil 9 of the electromagnet and the milliameter 20 is a linear indication of the flow rate of the fluid. As a consequence, a linear calibration of the milliameter 20 in terms of gallons per minute or other suitable quantity may be made to obtain an indication of flow rate in the pipe.

While a preferred embodiment of this invention has been illustrated in the drawing it will be appreciated that various changes may be made in the construction illustrated without departing from the spirit and scope of this invention. Suitable minor variations in the circuit for metering the current flow through the electromagnet coil with such an arrangement are deemed well within the scope of one skilled in the art. In view of the foregoing considerations, it is therefore intended that the foregoing disclosure shall be considered only as illustrative of the principles of this invention and not be interpreted in a limiting sense.

I claim as my invention:

1. A force responsive device comprising, in combination, a substantially cylindrical member of magnetic material having longitudinally disposed circular recesses one in each extremity thereof, a coil disposed in each circular recess, a force receiving armature member of magnetic material mounted for movement towards and away from one extremity of said cylindrical member, a circular armature fitting into the circular recess at the other extremity of said cylindrical member in spaced relation with the sides of said recess to form a longitudinally overlapping airgap in which the radial gap dimension is unchanged by movement of the circular armature, means connecting said circular armature with said force receiving armature, and circuit means for energizing the coil associated with said circular armature in dependence of the voltage of the coil associated with said force receiving armature.

2. Force responsive apparatus comprising in combination, a housing of magnetic material having a circular recess in each of two opposite ends thereof, said recesses being coaxial, a coil in each recess, a rod slidably mounted through said housing substantially concentrically of said circular recesses, a force receiving armature member mounted on one end of said rod for movement towards and away from the corresponding end of said housing, said force receiving armature member being normally spaced a small distance from said one end of said housing to form a small axial air gap therebetween and thereby forming with said housing a magnetic circuit linking the coil in said one end, which magnetic circuit is variable in reluctance upon axial displacement of said force receiving armature member to vary the axial dimension of said axial air gap, a ring of magnetic material fitted into the circular recess at the other end of said housing in spaced relation with the side walls thereof, mounting means connecting said ring with the remaining end of said rod for supporting said ring in said spaced relation with said side walls and effecting axial displacement of said ring with said rod, and circuit means connecting said coils together for controlling the energization of the coil associated with said ring armature in dependence of an electrical quantity of the remaining coil.

3. Force responsive apparatus comprising, in combination, an elongated housing of magnetic material having a circular recess in each end thereof and having a hole therethrough concentrically disposed of said circular recesses, a strain gauge coil disposed in the circular recess at one end of said housing, an electromagnet coil disposed in the circular recess at the other end of said housing, rod means slidably mounted in said hole and projecting beyond the ends of said housing, a force receiving armature member mounted on one end of said rod means at said one end of said housing in spaced relation with said one end of said housing to form an axial air gap therebetween, a ring armature mounted on the other end of said rod means and fitted into the adjacent circular recess in radially spaced relation with the side walls thereof, and circuit means connecting said coils to control the energization of said electromagnet coil in dependence of an electrical quantity of said strain gauge coil.

4. Force responsive apparatus comprising in combination, a housing of magnetic material having a circular recess in each of two opposite ends thereof, said recesses being coaxial, a coil in each recess, a rod slidably mounted through said housing substantially concentrically of said circular recesses, a force receiving armature member mounted on one end of said rod for movement towards and away from the corresponding end of said housing, said force receiving armature member being normally spaced a small distance from said one end of said housing to form a small axial air gap therebetween and thereby forming with said housing a magnetic circuit linking the coil in said one end and which magnetic circuit is variable in reluctance upon axial displacement of said force receiving armature member to vary the axial dimension of said axial air gap, a ring of magnetic material fitted into the circular recess at the other end of said housing in spaced relation with the side walls thereof, mounting means connecting said ring with the remaining end of said rod for supporting said ring in said spaced relation with said side walls and effecting axial displacement of said ring with said rod, circuit means connecting said coils together for controlling the energization of the coil associated with said ring armature in dependence of an electrical quantity of the remaining coil, and an indicating instrument connected in circuit with the coil associated with said ring armature to be energized in dependence of the current flowing therein.

5. Force responsive apparatus comprising, in combination, an elongated housing of magnetic material having a circular recess in each end thereof and having a hole therethrough concentrically disposed of said circular recesses, a strain gauge coil disposed in the circular recess at one end of said housing, an electromagnet coil disposed in the circular recess at the other end of said housing, rod means slidably mounted in said hole and projecting beyond the ends of said housing, a force receiving armature member mounted on one end of said rod means at said one end of said housing in spaced relation with said one end of said housing to form an axial air gap therebetween, a ring armature mounted on the other end of said rod means and fitted into the adjacent circular recess in radially spaced relation with the side walls thereof, circuit means connecting said coils to control the energization of said electromagnet coil in dependence of an electrical quantity of said strain gauge coil, and an indicating instrument connected in circuit with said electromagnet coil to be energized in dependence of the current flowing therein.

FRANK W. GODSEY, Jr.

REFERENCES CITED

The following references are of record in the file of this patent:

UNITED STATES PATENTS

| Number | Name | Date |
| --- | --- | --- |
| 1,724,081 | Finley | Aug. 13, 1929 |
| 1,855,205 | Schur | Apr. 26, 1932 |
| 1,885,578 | Boykow | Nov. 1, 1932 |
| 1,953,819 | Payne | Apr. 3, 1934 |
| 2,082,539 | Fischer | June 1, 1937 |
| 2,319,363 | Wunsch | May 18, 1943 |
| 2,360,751 | Ziebolz | Oct. 17, 1944 |
| 2,371,040 | Fisher et al. | Mar. 6, 1945 |